US010209369B2

(12) United States Patent
Bienenstock (10) Patent No.: US 10,209,369 B2
(45) Date of Patent: Feb. 19, 2019

(54) PHOTON DETECTION APPARATUS AND METHOD FOR IMAGING (71) Applicant: Elazar A. Bienenstock, Toronto (CA)

(72) Inventor: Elazar A. Bienenstock, Toronto (CA)

(*) Notice: Subject to any disclaimer, the term of this patent is extended or adjusted under 35 U.S.C. 154(b) by 0 days.

(21) Appl. No.: 15/303,305

(22) PCT Filed: Apr. 2, 2015

(86) PCT No.: PCT/CA2015/000231
§ 371 (c)(1),
(2) Date: Oct. 11, 2016

(87) PCT Pub. No.: WO2015/154165
PCT Pub. Date: Oct. 15, 2015

(65) Prior Publication Data
US 2017/0038478 A1 Feb. 9, 2017

(30) Foreign Application Priority Data
Apr. 11, 2014 (CA) .................................. 2848831

(51) Int. Cl.
G01T 1/24 (2006.01)
G01T 1/164 (2006.01)
H04N 5/30 (2006.01)

(52) U.S. Cl.
CPC .......... G01T 1/1642 (2013.01); G01T 1/1647 (2013.01); G01T 1/249 (2013.01); H04N 5/30 (2013.01)

(58) Field of Classification Search
CPC ...... G01T 1/2018; G01T 1/2928; G01T 1/243; G01T 1/244; G01T 1/249; G01T 1/2008
See application file for complete search history.

(56) References Cited

U.S. PATENT DOCUMENTS

| 4,639,600 A | * | 1/1987 | Laurer .................. G01T 1/166 250/363.01 |
| 6,815,687 B1 | * | 11/2004 | Branch-Sullivan ......................... H01L 27/14658 250/330 |
| 8,280,124 B2 | * | 10/2012 | Dichterman ......... A61B 6/4258 378/8 |
| 2004/0251419 A1 | | 12/2004 | Nelson et al. |
| 2006/0054828 A1 | | 3/2006 | Fritzler et al. |

FOREIGN PATENT DOCUMENTS

WO 2007109227 A2 9/2007

OTHER PUBLICATIONS

Pedemonte et al., "Joint estimation of the activity and the events of interaction in SPECT systems," 2012, IEEE Nuclear Science Symposium and Medical Imaging Conference Record, pp. 3397-3400.*

* cited by examiner

Primary Examiner — Kiho Kim
(74) Attorney, Agent, or Firm — The Webb Law Firm (57) ABSTRACT A photon detector for use in imaging, comprising a detector surface for detecting photons incident on the detector surface, the detector surface comprising at least one non-flat feature configured such that, during imaging, at least a portion of the photons are blocked from incidence upon at least a portion of the detector surface.

30 Claims, 8 Drawing Sheets

PHOTON DETECTION APPARATUS AND METHOD FOR IMAGING

CROSS-REFERENCE TO RELATED APPLICATIONS

This application is the United States national phase of International Application No. PCT/CA2015/000231 filed Apr. 2, 2015, and claims priority to Canadian Patent Application No. 2,848,831 filed Apr. 11, 2014, the disclosures of which are hereby incorporated in their entirety by reference.

FIELD OF THE INVENTION

This invention is directed to the field of photon detection and image reconstruction, most typically in the context of Single Photon Emission Computed Tomography.

BACKGROUND OF THE INVENTION

Nuclear medicine is a field of medicine concerned with the use of radiation for diagnostic purposes. Single Photon Emission Computed Tomography (referred to in this specification as "SPECT"), a branch of nuclear medicine, involves directly measuring gamma rays emitted by radionuclides administered to a patient to produce slice-like images of the patient. "Tomography" refers to the production of slice-like images, or tomograms. Computerized Tomography (CT) refers to the use of computer processing to derive the tomogram.

Typically, in SPECT procedures, radiopharmaceuticals (otherwise known as radioactive tracers or radiotracers) are administered to patients. Radiopharmaceuticals are generally compounds consisting of radionuclides (i.e. radiation-emitting atoms), combined with pharmaceuticals or other chemical compounds. In some cases, such as with Thallium-201, the same particle is simultaneously the radionuclide and pharmaceutical. Unlike positron emission tomography (PET), which uses small-nucleus radionuclides with half-lives ranging from just over a minute to under 2 hours, SPECT involves the use of radionuclides whose half-life is several hours to days long, long enough to clinically localize or become fixed in specific organs or cellular receptors. In these circumstances, it is possible to acquire important diagnostic information by obtaining images created from the radiation emitted by the radiopharmaceutical. In SPECT, cameras which receive and detect gamma rays emitted by the radiotracer are used in the imaging.

The end result of a SPECT procedure is a stack of tomograms that can be combined into a 3D image. To create the tomograms, the camera acquires multiple planar or projection images from different angles, This is typically done by one or more camera heads that rotate around the patient to acquire images from different angles, or less commonly by an immobile head that spans a substantial angular distance, and can thus simultaneously acquire multiple images from different angles. A computerized image reconstruction algorithm is then applied to the datasets from the planar images to produce a tomographic image dataset that can be combined to form a 3D image. It will be appreciated by those skilled in the art that the "3D" image is displayed on a flat computer monitor, and is thus not literally three-dimensional. Its three dimensional nature can only be appreciated if it is viewed, say, while spinning on a screen, or recreated as a sculpture.

SPECT cameras typically employ photon collimation, typically in the form of absorptive collimation, in which lead or occasionally tungsten is used to absorb (and thus eliminate from detection) most photons. In the case of parallel-hole collimators, the dominant form, all the photons that do reach the photon detector are collinear (i.e. have substantially parallel trajectories). Typical for parallel hole collimators the photons passed by the collimator have trajectories orthogonal to the planar photon detector. Other types of collimation may be used but all types depend on eliminating between 99.9% and 99.99% of incoming photons.

SPECT cameras are configured to detect photons, and to measure their energy and the location of their incidence on the photon detectors. Based on this information, and the fact that the photons are collimated, the precise trajectory of each incoming photon is known, assigning it a particular location on the planar image being created by the camera. This information is used by the computer in constructing the tomograms.

Knowing the appropriate location on the planar image to which each photon should be assigned is important because the information carried by SPECT images is conveyed, at least in part, via the relative intensity of activity in each part of the image. A portion of the image representing the source of a relatively large number of photons will be relatively intense and will generally be displayed as more intensely bright or dark, depending on the color scheme chosen for display. A portion of the image representing the source of a relatively small number of photons will be less intense.

For example, for Myocardial Perfusion Imaging (MPI), a radiotracer that emits gamma rays is injected into the patient. A feature of such radiotracers is that they are carried in the bloodstream into the myocardium (heart muscle), and become fixed in the myocardium. As a result, the distribution of radiotracer is indicative of relative blood flow through the myocardium. If a particular coronary artery is partially occluded, while the others are not, there will be relatively less radiotracer fixed in the portion of the myocardium supplied by that particular coronary artery. This would in turn be reflected in the SPECT image, where portions of the myocardium receiving greater blood flow would appear relatively intense, and those receiving less blood flow would be less intense.

However, there is a downside to the use of traditional absorptive parallel-hole collimation: between about 9990 and 9999 out of every 10,000 incident photons reaching the collimator are blocked out of the SPECT image. Only between about 1 and 10 out of every 10,000 photons are passed by the collimator to the detector to be included in the image. Other types of collimators (e.g. pinhole collimators) may block an even higher proportion of photons, with only a tiny percentage reaching the photon detector.

SUMMARY OF THE INVENTION

Therefore, what is desired is a camera having a photon detector, that can use a greater percentage of photons to create an image.

According to one aspect of the invention, there is provided a SPECT camera for creating a SPECT image of a body tissue, comprising:

a selectively positionable photon detector, including a detector surface, for (1) detecting photons from the body tissue incident on the detector surface, (2) emitting a photon incidence signal for each said incident photon, the photon incidence signal including incidence location information for the corresponding photon, and (3) emitting a photon energy signal for each said incident photon, the photon energy signal including energy level information for the corresponding photon;

a computerized image processor, operatively connected to the photon detector, for (1) receiving the photon incidence signals and photon energy signals transmitted by the detector, (2) processing the photon energy signals to exclude from the SPECT image photons having energy levels outside a predetermined energy level range, and (3) processing the photon incidence signals to produce a SPECT image dataset, using the incidence location information for each incident photon;

the detector surface comprising at least one non-flat feature configured such that, during imaging of the body tissue, at least a portion of the photons emitted from the body tissue are blocked from incidence upon at least a portion of the detector surface;

the photon detector being configured and positioned to admit to the detector surface uncollimated photons from the body tissue;

the computerized image processor being programmed with probabilistic imaging algorithm to create the SPECT image, wherein when each incident photon from the body tissue is detected, if there exist a plurality of non-zero probabilities of a corresponding plurality of incoming photon trajectories, these probabilities are used in creating the SPECT image.

In another aspect of the invention, there is provided a photon detector for use in SPECT imaging, the photon detector comprising a detector surface for detecting photons incident on the detector surface, the detector surface comprising at least one non-flat feature configured such that, during imaging of the body tissue, at least a portion of the photons emitted from the body tissue are blocked from incidence upon at least a portion of the detector surface.

According to another aspect of the invention, there is provided a camera for creating an image, comprising:

a photon detector, including a detector surface, for (1) detecting photons incident on the detector surface, and (2) emitting a photon incidence signal for each said incident photon, the photon incidence signal including incidence location information for the corresponding photon, the photon detector being preconfigured to detect photons in a predetermined energy range, but not outside the predetermined energy range;

a computerized image processor, operatively connected to the photon detector, for (1) receiving the photon incidence transmitted by the detector, and (2) processing the photon incidence signals to produce an image dataset, using the incidence location information for each incident photon;

the detector surface comprising at least one non-flat feature configured such that, during imaging, at least a portion of the image photons are blocked from incidence upon at least a portion of the detector surface;

the photon detector being configured and positioned to admit to the detector surface uncollimated photons;

the computerized image processor being programmed with probabilistic imaging algorithm to create the image, wherein when each incident photon is detected, if there exist a plurality of non-zero probabilities of a corresponding plurality of incoming photon trajectories, these probabilities are used in creating the image.

BRIEF DESCRIPTION OF THE DRAWINGS

Reference will now be made, by way of example only, to the figures which illustrate the preferred embodiment of the invention, and in which.

DETAILED DESCRIPTION OF THE PREFERRED EMBODIMENTS

Figure 1:
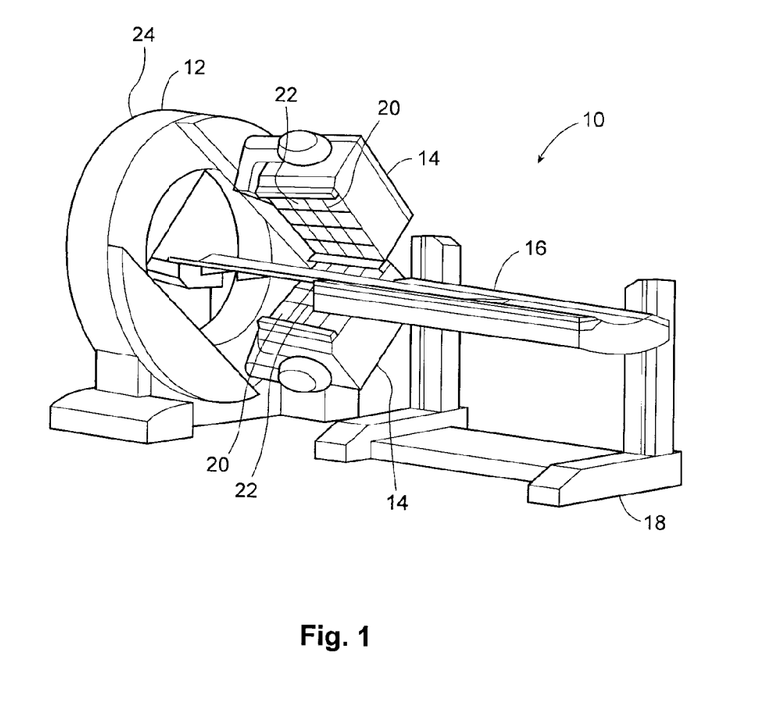
FIG. 1 is a perspective view of a SPECT camera according to the present invention.

Referring now to FIG. 1, an embodiment of the SPECT camera for creating a SPECT image of a body tissue according to the present invention is shown. The SPECT camera 10 comprises camera head support frame 12 which, in this embodiment, carries two camera heads 14. It will be appreciated that the use of multiple camera heads (two or more) may, in some embodiments, permit faster imaging by facilitating the faster acquisition of multiple projection images that are used to create the tomographic SPECT image. However, the invention also comprehends the use of a single camera head 14.

The camera 10 further includes a patient platform 16, on which the patient would lie, and patient platform support frame 18, for supporting the patient platform. For certain types of SPECT scans, it is desirable for the patient to be moved relative to the camera heads. The table 16 thus may be slidable relative to the support frame 18, permitting movement of the patient as required by the particular SPECT image being taken.

Mounted to each camera head 14 is a selectively positionable photon detector 20. Each photon detector 20 includes a detector surface 22 for (1) detecting photons from the body tissue incident on the detector surface, and (2) emitting a photon incidence signal for each such incident photon, the photon incidence signal includes incidence location information for the corresponding photon. Thus, the photon incidence signal indicates where on the detector surface 22 each photon was incident.

Preferably, the detector surface 22 also emits a photon energy signal which includes photon energy level information. This permits the processor 24 to discriminate between photons to be used in the SPECT image (i.e. photons having an energy level within the predetermined energy range) and photons not to be used in the SPECT image (i.e. photons having an energy level outside that range. Such energy discrimination is used to filter out of the image undesirable photons that reduce image accuracy such as, for example, Compton scatter photons and lead x-rays.

The SPECT camera 10 is configured to create a SPECT tomogram of a body tissue. There are a variety of different body tissues that are routinely subjected to diagnostic SPECT imaging. These include the heart (myocardial perfusion imaging), the brain, the thyroid, kidneys, lungs and bones. Tumor imaging and infection imaging are two further examples of the use of SPECT imaging to obtain information about body tissues.

To create the tomogram, the camera 10 acquires multiple projection images from different angles and stores them. In the preferred embodiment, these projection images are acquired by means of the movement of camera heads 14 to multiple positions from which projection images are acquired. It will be appreciated by those skilled in the art that other configurations may be employed to acquire multiple projection images (e.g. a wide angle camera head that can acquire multiple projection images from different angles without moving). A tomographic computerized image reconstruction algorithm is then applied to the datasets from the projection images to produce a tomographic image dataset, and thus, the SPECT image.

The SPECT camera further includes a computerized image processor, generally designated with reference numeral 24. The image processor 24 preferably comprises a combination of hardware and software that receives information from the photon detector, and uses that information to create projection images from various angles relative to the patient. The image processor 24 (which may comprise one or more actual processor devices) also uses those projection images to create a tomogram by applying a tomographic reconstruction algorithm to the set of projection images. The hardware and/or software of the processor may be positioned within the framework of camera 10 (e.g. support frame 12), or may, for example, be contained within a separate housing that is operatively connected to one or more other components of camera 10. What is important is that the computerized image processor 24 be operatively connected to detector 20.

Thus, the computerized image processor is operatively connected to the photon detector. It receives the photon incidence signals transmitted by the detector, and processes them to produce a projection image dataset using the incidence location information for each incident photon. The computerized image processor 24 creates the SPECT tomogram out of a set of projection images acquired over a large angular range.

In the preferred embodiment, the photon detector 20 is selectively positionable by means of being mounted to the camera head 14, which is movable to various positions to permit the taking of SPECT images of different parts of the body.

It is expected that the present invention can make more efficient and effective use of the information embodied in photons that come from the body tissue and are incident upon the photon detector surface. In prior art SPECT cameras, the photons are collimated, meaning that typically, only photons approaching the detector surface from a single orthogonal direction are allowed to reach the detector surface. The reason for this configuration is that, by collimating the photons, the trajectory of the photons that reach the detector surface is precisely known, and it is thus possible to calculate precisely from which area of the body area being imaged did the photon project. The downside, however, is that only between one ten-thousandth and one thousandth of the photons that could have reached the detector are typically used by prior art SPECT cameras. The rest are wasted by being blocked by the collimator or otherwise ignored.

By contrast, in accordance with the present invention, the photon detector 20 is configured and positioned such that uncollimated photons from the tissue 28 emitted by the radiotracer are admitted to the detector surface, and such that photon incidence signals corresponding to such photons are recorded by the photon detector. Admitting uncollimated photons to the photon detector has two main effects. The first is that a far larger number of photons are available for use by the processor 24 in constructing the diagnostic image. The second is that for most of these additional photons, there will be significant uncertainty as to where they came from. There is thus uncertainty about from which part of the tissue being imaged did each photon originate. As explained above, an important consequence of collimation is precise knowledge of the trajectory of each incoming, collimated, photon.

Figure 2A:
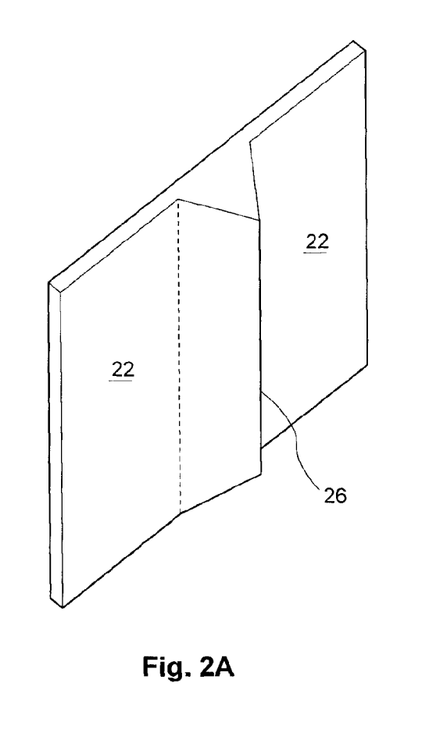
FIG. 2A is a schematic diagram of a photon detector according to the present invention.
Figure 2B:
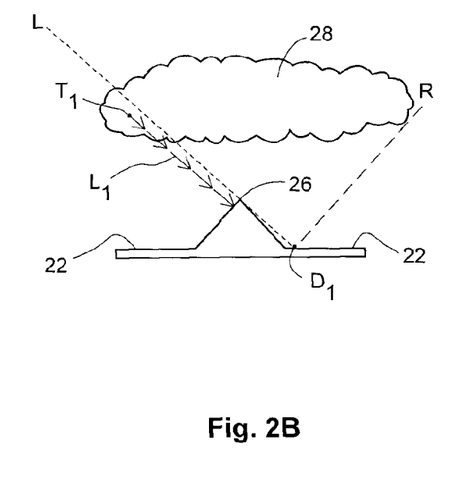
FIG. 2B is a simplified schematic diagram of a photon detector being used in the imaging of a tissue.

Referring now to FIGS. 2A and 2B, the detector surface 22 comprises at least one non-flat feature. In this specification, a non-flat feature means a protuberance and/or an indentation. The example detector of FIGS. 2A and 2B comprises a protuberance 26. The non-flat feature is configured such that, during imaging of the body tissue, at least a portion of the photons emitted from the body tissue are blocked from incidence upon a different part of the detector surface 22.

It will be appreciated by those skilled in the art that having such a non-flat feature (e.g. the protuberance 26) reduces the uncertainty as to incoming trajectories of the photons incident on the detector surface 22 (as compared with a featureless, flat detector surface). Because the preferred surface 22 has one or more features and is not flat, when a photon is incident on the surface 22, there will typically be some points within the body tissue being imaged from which the photon could not have originated. The reason is that the at least non-flat feature 26 is configured and positioned so as to block photons from at least some locations in the body tissue from reaching at least some points on the detector surface 22.

The schematic diagrams in FIGS. 2A and 2B show an example of how the protuberance 26 serves to reduce uncertainty as to the incoming trajectory of photons incident on the surface 22. FIG. 2A is a simplified perspective view of a detector surface 22 having a protuberance 26 in the form of central ridge 26 running from the top of surface 22 to the bottom. FIG. 2B is an elevation view of surface 22, with ridge 26, facing body tissue 28, which is being imaged.

As can be seen in FIG. 2B, the ridge 26 blocks at least a portion of the photons from body tissue 28 from reaching at least a portion of detector surface 22. For example, a photon originating from point $T_1$ in tissue 28 cannot reach point $D_1$ on surface 22, because it would be blocked by ridge 26. This is demonstrated by line $L_1$, whose trajectory (from $T_1$ to $D_1$) is blocked by ridge 26. Similarly, as can be seen in FIG. 2B, photons from various points in tissue 28 are blocked by ridge 26 from reaching various points on surface 22.

It will thus be appreciated that the at least non-flat feature (e.g. ridge 26 is FIGS. 2A and 2B) reduces uncertainty as to the point of origin of each photon incident on surface 22. In the absence of any non-flat features, any photon incident on surface 22 might have come from any point in tissue 28. However, with the at least one non-flat feature present, there is a portion of the tissue 28 from which each photon could not have originated. Uncertainty as to point of origin is thus reduced.

In the preferred embodiment of the invention, the computerized image processor is configured to apply a probabilistic imaging algorithm. When each photon from 28 incident on detector 20 is detected, if there exists a plurality of non-zero probabilities of a corresponding plurality of incoming photon trajectories, these probabilities are used by the imaging algorithm in creating the SPECT image. A higher probability would typically correspond to a greater increase in intensity in the image associated with the trajectory, and a lower probability a lower increase in intensity associated with the trajectory.

Using the configuration of FIG. 2B as an example, a photon incident on surface 22 could have arrived there on any trajectory located between line L and line R. Thus, there is a non-zero probability of each trajectory to D1 located in that range. The probabilistic imaging algorithm takes into account these non-zero probabilities, and adjusts the 2D SPECT image dataset (and thus, indirectly, the 3D image) accordingly. By contrast, there is a zero probability of any trajectory located to the left (in FIG. 2B) of line L. Thus, the 2D SPECT image would not reflect the possibility of any trajectory to the left of line L. Some trajectories within the range of possible trajectories are more likely than others, for example trajectories at the center of the range may be more likely than those at the edges of the range. This information is preferably incorporated in the probabilistic algorithm.

This method is to be contrasted with the prior art method which uses collimated photons. Typically, with collimated photons, there is essentially a non-zero probability of only one incoming trajectory for each photon at each point of incidence.

It will be appreciated that, in a sense, these non-zero probabilities comprise the information associated with each photon that is incident upon surface 22. The narrower the range of possible incoming trajectories of the photon, the greater the information carried by that photon, because there is greater certainty as to the photon's origin. The greater the number of possible incoming trajectories, and the smaller the probability of each one, the less information carried by the photon, because there is less certainty as to the photon's origin.

Thus, preferably, in creating the SPECT image using the incoming trajectory probabilities, the probabilistic imaging algorithm assigns greater positional weight to photons carrying greater positional information, and less weight to those carrying less positional information.

The present invention involves admitting uncollimated photons to the detector 20, with the result that many more photons are used to create the image, while each of those photons generally carries less positional information than the collimated photons. It is expected that having partial positional information (carried by uncollimated photons reaching detector 20) is better than having no positional information at all (which is what photons blocked by a collimator provide). It is also expected that the use of this device and method would increase by several orders of magnitude the number of photons used in SPECT scans, and that this increase would improve scan speed, and/or spatial resolution and/or contrast resolution, while facilitating lower radiation doses.

Figure 5:
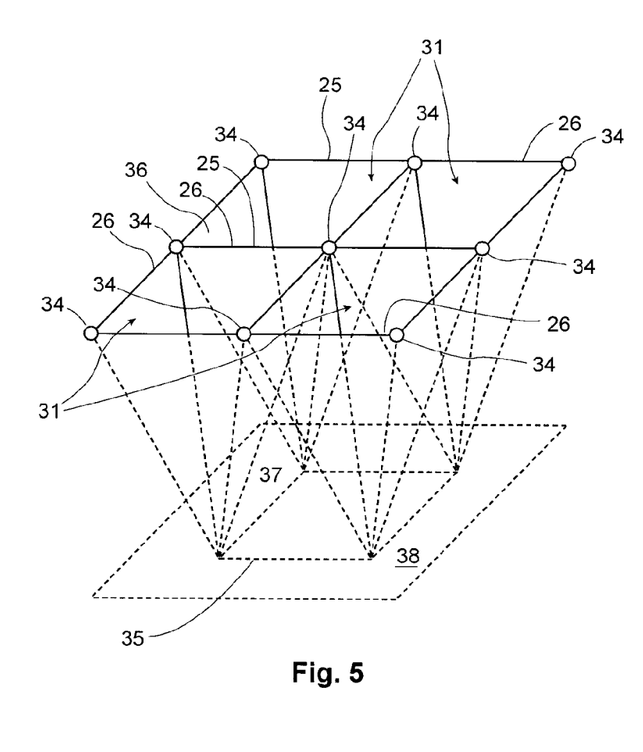
FIG. 5 is a perspective view of a photon detector according to the present invention.

A preferred form of detector 20 and detector surface 22 is shown in FIG. 5. The preferred surface 22 comprises a grid pattern of ridges 26, with the outer edges of the ridges forming square openings 30. In this context, "outer" or "outward" refer to a position closer to the tissue being imaged, and "inner" or "inward" refer to a position further from the tissue being imaged. The surface 22 extends inward from each side of each square opening 30, with the result that the surface 22 comprises a series of inverted pyramids 31, with the vertices 32 of the pyramids oriented inwardly, and the square base (i.e. the square opening 30) being oriented outwardly. The inverted pyramids 31 each have four sides 33 extending from opening 30 to point 32. Thus, photons from tissue 28 approach detector surface 22 and enter through one of the square openings 30, eventually reaching the surface 22 somewhere within the inverted pyramid. In some embodiments, photons may also contact surface 22 at the outer edge 25 of ridges 26. FIG. 5 shows four inverted pyramids 31 for the purposes of illustration, but it will be appreciated that the surface 22 could have more or less than this number of inverted pyramids 31.

Figure 4:
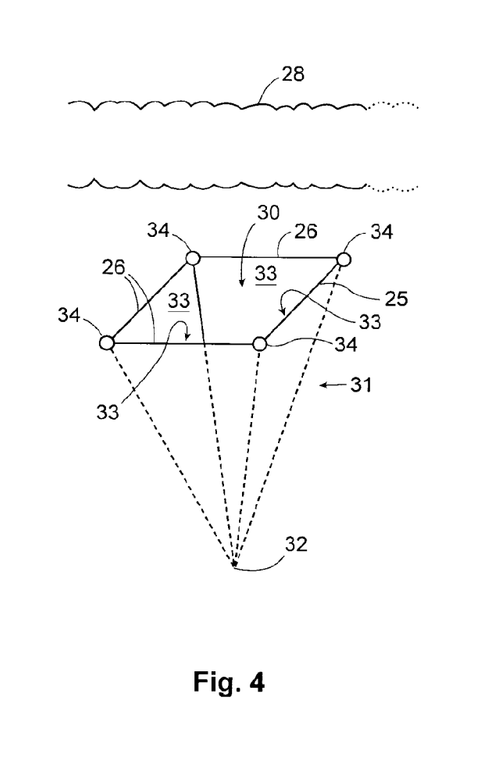
FIG. 4 is a cutaway view of a portion of the photon detector of the present invention.

FIG. 4 shows, for illustrative purposes, a single inverted pyramid 31 having point 32, a square opening 30, and sides 33. The sides of the opening 30 comprise edges 25.

It will be appreciated by those skilled in the art that the inverted pyramid shape provides expected advantages in the creation of SPECT images. As mentioned above, a probabilistic imaging algorithm is preferably employed. In the configuration shown in FIG. 4, the probabilities associated with each photon can be assessed based on the location within inverted pyramid 31 where the photon strikes surface 22.

It will be appreciated that the further inward within inverted pyramid 31 is the point of incidence of a photon, the more certain is the incoming trajectory of the photon, because a relatively narrow range of trajectories extend to the inward portion of inverted pyramid 31. The further outward is the point of incidence, the less certain is the incoming trajectory, because relatively more trajectories extend to outward locations on surface 22. In other words, as compared with locations further inward in inverted pyramid 31, a photon reaching an outward portion of the surface 22 in an inverted pyramid 31 has a greater number of possible origins within tissue 28. As a result, the further inward a location is within inverted pyramid 31, the fewer photons will reach that location, and the greater the information that will be carried by each such photon. This is a result of the fact that each inverted pyramid becomes progressively more shielded from the source as it extends inward, and thus harder for photons to reach.

As described above, the detector surface 22 preferably comprises a grid pattern of ridges 26 arranged to form multiple inverted pyramids 31. As shown in FIG. 5, surface 22 preferably includes outer surface 36 and inner surface 38. In this embodiment, inverted pyramids 31 are part of outer surface 36.

Preferably, the outer surface 36 includes pinholes 34, which are most preferably located at the plurality of intersection points of ridges 26 in the grid of surface 22. The pinholes 34 are sized, shaped and positioned to admit photons through the outer surface 36 of detection surface 22.

At each intersection point between ridges 26, there is a pinhole 34 sized, shaped and positioned to admit photons from tissue 28 through outer surface 36, so that they may reach and be incident upon inner surface 38. Inner surface 38 is located inward from outer surface 36, and is preferably generally flat. In this embodiment, photons travelling through pinholes 34 would be detected at inner surface 38 rather than outer surface 36.

Most preferably, inner detector surface 38 would be comprised of inner surface sections 35, each inner surface section 35 corresponding to a particular pinhole 34. In the preferred embodiment shown in FIG. 5, each section 35 is generally square, with the vertices of the square lining up with points 32 of the four inverted pyramids 31 adjacent to the corresponding pinhole 34. At the edges of detector 20, where there may be pinholes 34 without four adjacent inverted pyramids 31, the size of section 35 may be adjusted accordingly.

Also, the detector 20 preferably includes inner septa 37, one of which is shown in cutaway view, as an example, in FIG. 5. The purpose of inner septa 35 is to prevent photons passing through one pinhole 34 from reaching and being detected on a section 35 not corresponding to that one pinhole 34, but to another pinhole 34. It will be appreciated that if a photon enters a pinhole 34 at a sufficiently oblique angle, the photon may undesirably reach and be detected on a non-corresponding section 35. Preferably, inner septa 37 lie in a generally vertical plane (vertical being the direction from inward to outward), positioned generally at each of the four sides of section 35. In this position, photons tracking toward a non-corresponding section 35 can be absorbed or otherwise blocked by inner septa 37.

An expected advantage of the present invention is that a greater proportion of incoming photons can be used to create the SPECT image. However, a user or camera manufacturer may find that, in relation to photons carrying little information, the marginal benefit of using such photons is low, and that there is an overall benefit to excluding such photons while increasing the information level of others using photon-absorbing septa 37.

While a relatively small proportion of photons will enter pinholes 34 (because they take up a small proportion of the area that outer surface 36 presents to incoming photons), those that do enter pinholes 34 will generally be relatively high information photons.

It will be appreciated that in the preferred embodiment, the inner surface 38, and pinholes 34, provide a number of expected advantages. One is that the inner surface 38 provides additional detector surface space usable to create SPECT images, with the result that more information is available to create the SPECT image.

A second is that pinholes 34 and inner surface 38 are configured to convert some lower information photons to higher information photons. As mentioned above, photons incident upon the outer portions of outer surface 36 are generally lower information photons. The lowest information photons are those that are incident at or near edges 25, because such photons have the largest number of possible trajectories from tissue 28.

In the preferred embodiment, pinholes 34 are positioned at the intersection points of edges 25 in the grid. Photons detected at the outer surface 36 at the locations of pinholes 34 would be low information photons. However, in the preferred embodiment, they enter pinholes 34. A photon entering pinhole 34 and striking inner surface 38 is a higher information photon, because the pinholes 34 significantly limits the number of possible origins of photons passing through each one based on the specific point of incidence of the photon on inner surface 38.

Thus, it is expected that data from photons entering pinholes 34 and being detected on inner surface 38 would be used to supplement and improve the data from photons detected on outer surface 36. This more detailed data would preferably be used as a template by the reconstruction algorithm in producing improved SPECT images from the lower information photons incident on outer surface 36.

Traditional Anger SPECT cameras use NaI and photomultiplier tube (PMT) technology for photon detection, and this invention comprehends the use of that technology. However, in the preferred embodiment of the present invention, the surface 22 comprises a solid-state detector. Of current detector technologies, the most preferred is cadmium zinc telluride (CdZnTe), or CZT. CZT has a number of advantages in the context of the preferred embodiment of the present invention. One advantage is that a CZT layer for detecting incident photons takes up substantially less space than the aforementioned NaI/PMT technology. In the preferred embodiment, which would include a plurality of ridges and valleys in a grid pattern, CZT is more convenient and space efficient than PMT. CZT is potentially capable of being formed in or into a variety of shapes, making it well-suited to the preferred embodiment.

Other solid state photon detector materials exist, but many of them cannot presently be used at room temperature. Instead, they are cooled by liquid nitrogen or some other expensive method to low temperature, to decrease random electronic noise. The materials requiring cooling are thus less preferred, though still comprehended by the invention. By contrast, CZT can operate effectively at room temperature. In addition, CZT (and other solid state detectors) can successfully operate under much higher photon count rates per unit area as compared to NaI-based Anger cameras. In the present invention, the outer portions of the outer surface 36 may have high photon fluxes, to which CZT is better suited. CZT, on the other hand, is relatively expensive. Thus, in one alternate embodiment, CZT may be used in the outer (or higher photon count) portions of surface 22, and NaI in the inner (or lower photon count) portions of surface 22. Another possibility is to use NaI for inner surface 38, and for inner sections 35.

Another feature of CZT is that 5 mm of CZT stops (and thus detects) 80 to 90 percent of 140 keV photons (which is the energy level of photons from Technetium-99, a commonly-used radiotracer). In other words, 80-90 percent of such photons do not pass through a 5 mm thickness of CZT. Thus, the detector surface 22 may comprise a layer of CZT having a thickness of 5 mm or less. That such a thin layer of CZT can be effectively used makes it more practical for the detector surface 22 to comprise a large number of ridges and valleys, both from the perspective of cost, and of space efficiency. It will be appreciated that the greater the number of ridges and valleys, and the deeper the valleys, the greater the average level of information carried by photons hitting the detector surface 22. The reason is that greater pyramid frequency and valley depth both reduce the number of possible trajectories of any photon striking detector surface 22. The result is that having more and deeper valleys helps produce better SPECT images, and this result is more practically obtainable using CZT.

It is possible to select the thickness of the CZT layer to increase the amount of information carried by photons at the expense of detecting fewer photons overall. It may also possible to vary the thickness of the CZT layer over the area of the detector surface 22 though doing so may be complicated and costly.

Figure 6:
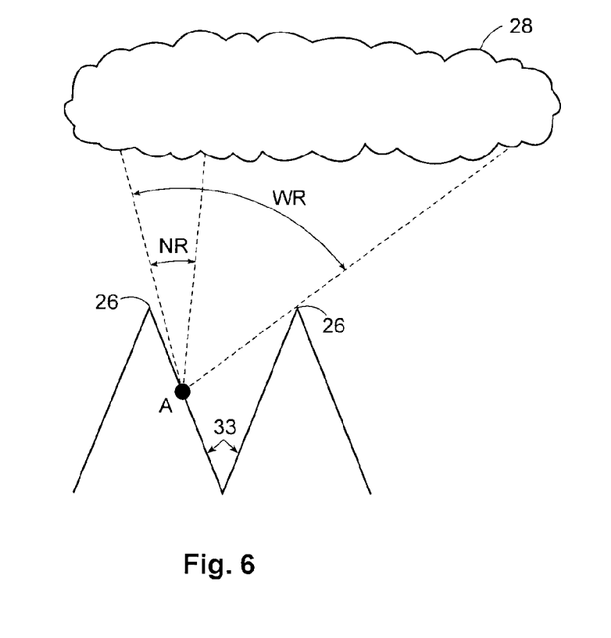
FIG. 6 is a schematic diagram showing various photon trajectories in relation to the photon detector.

FIG. 6 provides an illustration of how the thickness of the CZT layer may be selected to increase the amount of information carried by photons. FIG. 6 is a simplified elevation view of two adjacent ridges 26, and shows sides 33. In the illustrative scenario of FIG. 6, a photon P has travelled from tissue 28 and has been incident upon a side 33 at point A.

As can be seen in FIG. 6, there is a wide range, WR, of trajectories that the photon P could have taken from tissue 28 to detector surface 22. As a result, photon P is a relatively low information photon.

It will be appreciated, however, that the thickness of the CZT at point A can be adjusted to increase the amount of information in a photon P that is detected by the CZT.

If the CZT is 5 mm thick at point A, then virtually all (80-90%) of the photons reaching that point would be detected, along any trajectory within the range WR. However, if the CZT layer's thickness is reduced, the most likely range of trajectories is reduced to a narrower range, NR.

Figure 7:
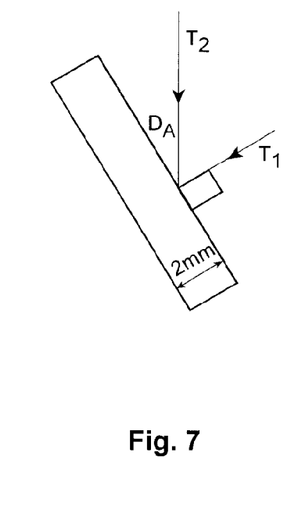
FIG. 7 is a schematic diagram showing various photon trajectories in relation to the photon detector.

FIG. 7 shows an example CZT layer 40, having a thickness of 2 mm. A photon $P_1$ striking CZT layer 40 travelling on a generally orthogonal trajectory to the detector surface at that point $T_1$ is likely to pass right through layer 40 without detection, because photon $P_1$ faces only 2 mm of CZT, which is not sufficient to block most 140 keV photons Next, consider photon $P_2$, arriving at the CZT layer along trajectory $T_2$, trajectory $T_2$ having an angular displacement of $D_A$ from the CZT layer. If $D_A$ is 23.6 degrees or less, then photon $P_2$ will face 5 or more millimeters of CZT. Thus, photon $P_2$ will be detected 80-90% of the time (or more, depending on angle $D_A$).

It will thus be appreciated that the probability of photon detection increases gradually with increasing obliqueness of the trajectory to the detector. The SPECT imaging algorithm preferably takes this into account.

Thus, FIGS. 6 and 7 show an example of how changing the thickness of CZT layer 40 will increase the information of photons detected by virtue of their incidence on detector surface 22. In the example case illustrated, reducing the thickness of the CZT layer increases the likelihood that the photon's incoming trajectory is oblique, and decreases the likelihood that the incoming trajectory was orthogonal to side 33. By contrast, with a 5 mm CZT layer, the probabilities of the different trajectories would have been more similar, and thus, the information carried by the incident photon would have been less.

It will be appreciated that the tradeoff for increasing the information carried by detected photons in this manner is that fewer photons are detected by the thinner crystal. In the example of FIGS. 6 and 7, photons having an orthogonal incoming trajectory are more likely to pass through the 2 mm CZT layer 40 without detection, in which case they are unused.

It will also be appreciated that it is possible to estimate the depth of interaction (DOI) of a photon with the CZT or other solid state detector. This can be done by measuring the time it takes the cloud of charges to reach the anode and cathode of the detector. In one embodiment, the DOI information could be used by the probabilistic imaging algorithm to estimate trajectory, by assigning a greater probability of more perpendicular trajectories to deeper interactions.

Depending on the configuration of the detector surface, it may be helpful to have a layer of lead, tungsten, or other photon-absorbing material on the underside of some or all of the CZT. As explained above, depending on the trajectory of an incoming photon and the thickness of the CZT at the point of incidence, the photon may pass right through the detecting surface without detection. Depending on its trajectory, that same photon may approach another portion of the detector surface from behind and be detected there. Such an interaction would be undesirable, because it would result in that photon being assigned a false trajectory by the processor under the false assumption that the photon arrived from the external surface, as opposed arriving from behind. With a layer of photon absorbing material (e.g. lead, tungsten) behind some or all of the detector surface, this undesirable phenomenon can be reduced or eliminated. It will be appreciated that in some forms of detector surface 22, it may not be worthwhile to line all of the surface 22 from behind with a photon absorbing material, because lining less that the entirety of surface 22 would sufficiently reduce or eliminate undesirable detections that imply false trajectories.

It will be appreciated that the probabilistic imaging algorithm can be configured to account for the parameters of the detector, including, for example, the thickness of the CZT layer at each point on the detector surface, the detection characteristics of CZT, the energy level of the incoming photons, the shape of the detector surface and more. Specifically, how a detected incoming photon is reflected in the SPECT image will depend on these parameters, because these parameters affect the probabilities the particular photons arrived at detector surface 22 along particular trajectories.

There are other ways in which varying either the thickness or the location of CZT can affect the amount of information obtainable from incoming photons. For example, as mentioned above, detector surface 22 may include inner surface 38 for detecting photons entering through pinholes 34. Locating CZT on such an inner surface, together with the use of pinholes, increases the amount of information associated with the detected photons travelling through the pinholes.

Pinholes 34 are positioned on outer surface 36, preferably but not necessarily at the intersection of ridges 26. Though pinholes 34 may be positioned anywhere on outer surface 36, they are expected to provide the greatest benefit when positioned at edges 25, i.e., where a photon striking outer surface 36 would carry the least trajectory information and where the pinhole is centered over the internal detector surface belonging to it. As shown in FIG. 5, preferably, each pinhole 34 is centered over corresponding section 35. Photons entering a pinhole 34 and detected on a particular location on corresponding section 35 can be used by the imaging algorithm. Based on that location of detection (and possibly depth of interaction, as discussed herein), the algorithm can calculate the trajectory or set of possible trajectories for the photon, and adjust the SPECT images according to the resulting pinhole projection image.

In another embodiment, the camera and particularly the processor 24 is programmed to cause the detector surface 22 to translate and/or rotate during the acquisition of data for the SPECT image. The purpose, and desired effect, of translation generally is to cause the camera to expose equivalent points of the detector to all relevant parts of the tissue being scanned. It is anticipated that translation increases the high-information detector-area sampling frequency of the source object (i.e. the tissue 28 being scanned) to create a more detailed SPECT image.

Figure 8:
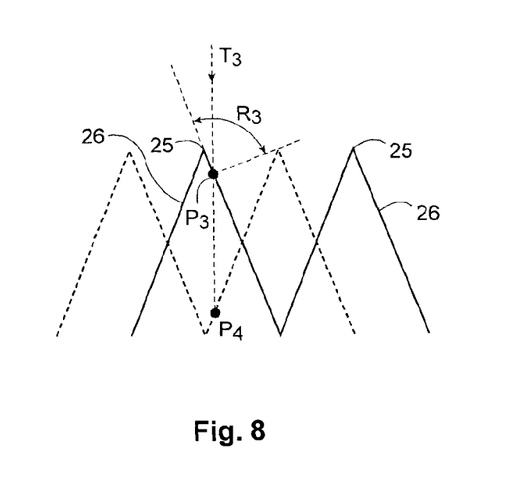
FIG. 8 is a schematic diagram showing various photon trajectories in relation to the photon detector with translation of the photon detector.

The effect of translation in relation to an embodiment of this invention can be seen in FIG. 8. In FIG. 8, a cross-sectional elevation view of a portion of a preferred detector is shown. In dotted outline, the detector surface is translated to the left by one half the length of the outer edge of inverted pyramid 31.

As can be seen in FIG. 8, translation permits the scanning of tissue 28 from more than one detector position for the same 2D image, resulting in increased equalization of the amount of detail being received by the camera across the entire image.

Suppose that as a result of the characteristics of a particular tissue 28, a large number of photons are arriving at detector surface 22 along trajectory $T_3$, or similar trajectories, at or around point $P_3$. Because any photon reaching $P_3$ could come from a wide range of trajectories (range $R_3$), the photons detected around $P_3$ are relatively low information photons.

However, translating detector surface 22 causes photons on trajectory $T_3$ to reach detector surface 22 at point $P_4$.

Point $P_4$ is located near the inward end of inverted pyramid 31. Photons detected at $P_4$ are higher information photons. Thus, the translation of detector surface 22 facilitates an increase in the information carried by certain photons. In general, such a benefit may be obtained because translation of surface 22 facilitates the scanning of the tissue from different angles as part of the same image. By translating surface 22, it is expected that high quality information obtained from certain incoming photons occurs at more locations in the source.

It will be appreciated that the nature and extent of such translation can be selected depending on the sort of imaging results desired in particular cases. For example, for each image, the surface 22 may be translated relative to tissue 28, once, twice or some greater number of times, corresponding to scanning tissue 28 from two, three or more position.

It may be beneficial in some circumstances to rotate the surface 22 relative to tissue 28 during the acquisition of an image. Rotation may be particularly beneficial in cases where the detector surface 22 has fewer or simpler features as compared with the preferred detector surface described above.

Figure 9:
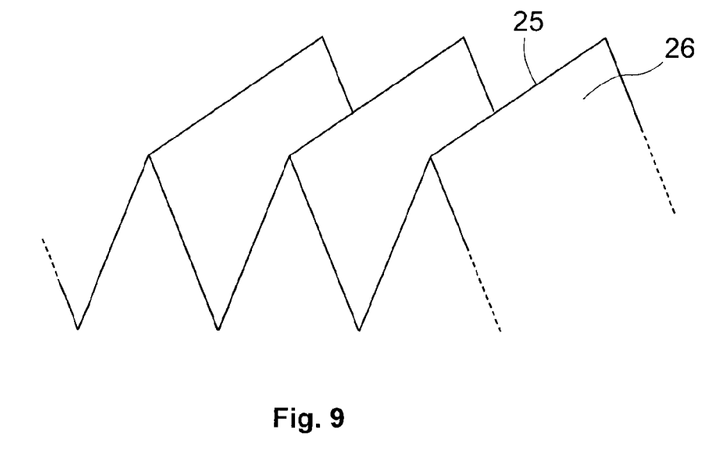
FIG. 9 shows an alternative version of the photon detector.

For example, FIG. 9 shows a portion of a version of detector surface 22 comprising a series of parallel ridges 26, without the grid pattern of the embodiment of, for example, FIG. 5.

By rotating surface 22 (e.g. by 90 degrees) relative to tissue 28 during the acquisition of an image, there is, as with translation, and increase in high-information sampling frequency of the source tissue 28. In the embodiment of FIG. 9, the line of ridges runs only along one axis (say, the x-axis) of detector surface 22, but not along the other (say, the y-axis). By rotating the surface 22 by 90 degrees for each 2D image, the camera presents to the tissue 28 both a detector with a line of ridges along the x-axis, and one with a line of ridges along the y-axis. Thus, the use of rotation can result in the simplified detector of FIG. 9 producing images that better approach, in their level of detail, the images produced by the preferred embodiment of FIG. 5. Rotational stops can be more frequent than 90 degrees to increase the number of angular views of the tissue. Other modes of movement of surface 22 are also comprehended by the invention. For example, as discussed above, in the embodiment of FIG. 5, photons hitting surface 22 near the inward points of inverted pyramids 31 are high information photons. In one embodiment, the SPECT camera may employ a version of translation comprising rectilinear scanning in the acquisition of each image. With rectilinear scanning, the surface 22 is translated such that a vertex 32 of an inverted pyramid 31 passes directly opposite all or substantially all every relevant point in tissue 28. Such rectilinear scanning is advantageous because it facilitates detection of the highest information photons (i.e. those reaching the inward point of inverted pyramids 31) from all areas of tissue 28.

As can be seen from FIG. 5, the outward end of each inverted pyramid 31 forms a square opening 30. To achieve the preferred result from rectilinear scanning, each vertex 32 would be scanned over the area of its corresponding square 30. This would typically be done by having the surface 22 translate a particular (and possibly predetermined) number of times to move the vertex to the same number of positions so as to substantially cover the area of the square. At each position, photons are detected. After all of the positions have been reached, the scan may be complete.

It will be appreciated that the predetermined number of rectilinear scan positions will depend on the desired resolution of the image. For greater resolution, there will be a greater number of positions to which the detector surface 22 moves in each rectilinear scan. For lower resolution, there may be fewer positions.

It will be appreciated that the translation, rotation, and rectilinear scanning may take other forms besides the preferred forms described above. What is important is that movement of the surface 22 may be in some embodiments be used to obtain greater sampling of the tissue 28 being scanned, to create superior images.

Figure 10:
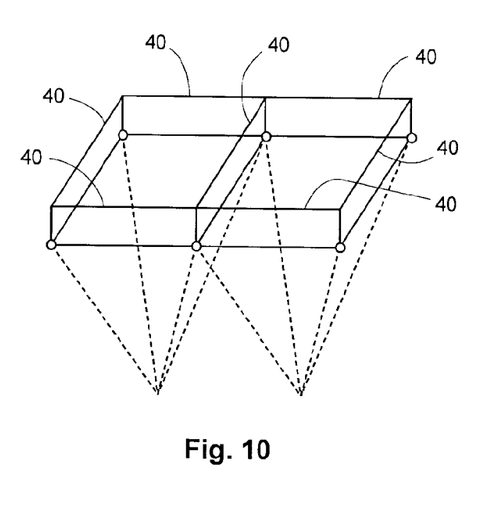
FIG. 10 shows a perspective view a photon detector with absorptive septa.

In one embodiment, the detector surface 22 may have absorptive septa 40 positioned on it. Most preferably, absorptive septa 40 would be positioned on ridges 26 at edges 25, extending outwardly, as shown in FIG. 10 (though other positions and configurations are comprehended). The configuration and composition of absorptive septa 40 would be such that they would absorb photons that reach them.

It will be appreciated that at positions near edges 25, because there are a wide range of trajectories along which photons can reach such positions, there may be very high photon fluxes. Such photon fluxes may well paralyze conventional Anger cameras with NaI and PMT detection technology. Solid state detectors such as CZT are capable of substantially higher count rates. Nevertheless, absorptive septa 40 may be advantageous for a number of reasons. One is that, under some circumstances, the photon count rates near ridges may be too high, even for solid state detectors such as CZT or associated electronics. Second, it may be that the photons reaching positions near ridges 26 carry little enough information that the computing cost of processing them is not justified.

Figure 11:
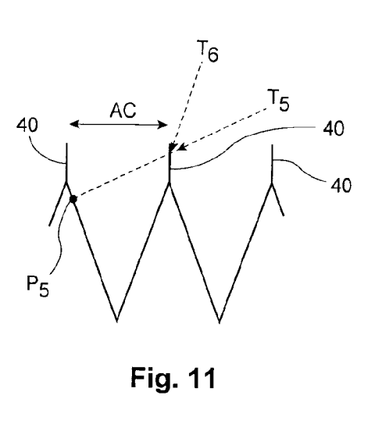
FIG. 11 shows an elevation view of a photon detector with absorptive septa.

Thus, the absorptive septa 40 are preferably configured and positioned to block some photons from reaching positions on surface 22 at or adjacent to ridges 26. For example, as shown in FIGS. 10 and 11, and in detail in FIG. 11, the most preferred absorptive septa 40 are positioned on edges 25, and extend directly outward (i.e. they generally bisect the angle formed by ridge 26 at edge 25). Thus, they will tend to block a substantial number of photons whose trajectories are strongly oblique, that is, whose trajectory has a substantial directional component across the tissue 28 and the surface 22 (direction AC in FIG. 11).

An example of this function is shown in FIG. 11. In FIG. 11, trajectory T5 is shown. T5 is an oblique trajectory with a substantial component across the front of detector surface 22 (i.e. in direction AC). Because of the substantial component in the direction AC, a photon travelling on trajectory T5 would, absent absorptive septa 40, strike surface 22 at a point P5 near the outer edge of a ridge 26. A photon hitting that point is a relatively low information photon, as there are a wide range of trajectories along which a photon could arrive at point P5.

However, absorptive septa 40 preferably extend outwardly from the edges 25 of ridges 26, acting essentially as upright screens that block photons moving across the face of surface 22. Thus, such obliquely directed photons would, if allowed to reach surface 22, would strike near the edge 25 of a ridge 26, since their oblique trajectories would not permit them to enter more deeply into inverted pyramids 31. The septa 40 block obliquely directed photons from hitting surface 22 near the edges of ridges 26, with the result that the photons that are permitted to hit surface 22 near edges of ridges 26 carry greater trajectory information.

It will be appreciated that the absorptive septa 40 may also, undesirably, block a relatively small number of photons that, though slightly oblique, have a trajectory that would otherwise allow them to reach the surface 36 deep within inverted pyramid 31 and be high information photons. Such a trajectory is labeled in FIG. 11 as T6. However, it is believed that the vast majority of photons blocked by septa 40 as shown in FIGS. 10-11 will likely be low information photons, and that the loss of a relatively small number of high information photons may not negate the value of septa 40.

It will be appreciated that the invention comprehends a variety of different shapes for the surface 22, including but not limited to those described above. The surface may be any non-flat surface. It may include one or more protuberances and/or one or more indentations. It may include repeating patterns of protuberances and indentations, as with, for example, the embodiments of FIG. 3, 5, 9 or 11. The pattern may repeat in one direction (e.g. either length or width of the surface 22) or two directions (e.g. both length and width). The preferred surface 22 comprises a plurality of protuberances (e.g. ridges 26) and indentations (e.g. inward portions of inverted periods 31). This configuration permits the use of uncollimated photons, in conjunction with a probabilistic imaging algorithm. Photons striking the detector within the indentations will typically be higher information photons. Other techniques, such as translation, rotation and rectilinear scanning, can be used to improve the imaging benefits obtained from the photons entering the indentations. Other techniques (e.g. pinholes and an inner surface) can be used to improve the information carried by certain incoming photons. Still other techniques (e.g. absorptive septa) can be used to filter out photons that are low information photons not beneficial for use in image creation.

Figure 3:
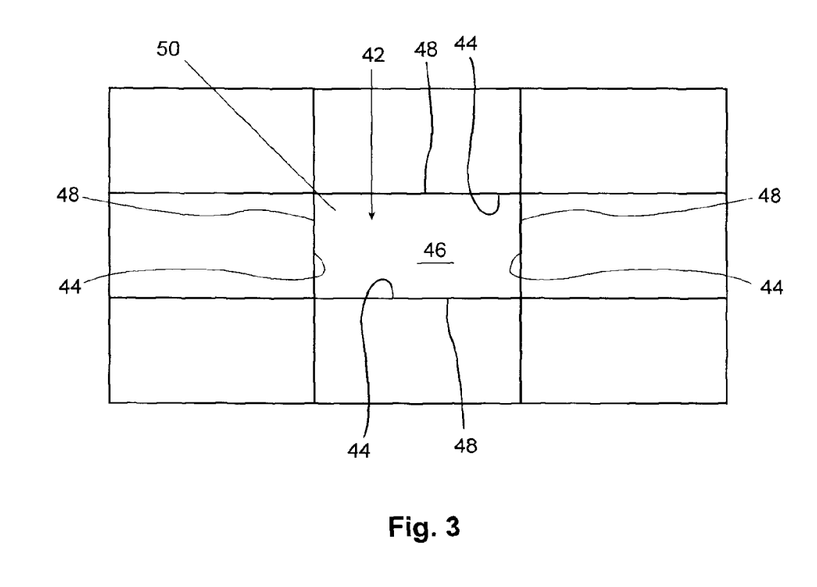
FIG. 3 is a perspective view of the preferred form of the photon detector.

FIG. 3 shows a plan view of an alternative detector 22 comprising a plurality of cuboid or cubic indentations 42, having protuberances in the form of walls 44, the walls 44 having outward edges 48, which form squares 50. The generally cuboid or cubic indentations 42 further include inner floors 46. Thus, the walls 44 are generally perpendicular to floors 46. In FIG. 3, reference characters are shown for only one indentation 42 and set of walls 44, but the pattern repeats along both the length and width of the surface 22.

As described above, the surface 22 is preferably a layer of CZT, though other detection configurations (e.g. NaI) are comprehended. In particular, in the embodiment of FIG. 3, NaI can be used at the floor 46, where the photon flux is lower. This may be done for cost reduction. It is preferable in any event to use CZT at the outward portion of surface 22, where photon fluxes are higher and the surface is complex. This embodiment also comprehends various features mutatis mutandis, described above, such as absorptive septa 40.

It will be appreciated that the invention described is not limited to any preferred embodiment. For example, various shapes for indentations and protuberances are comprehended. The opening or cross-section of the indentations may be any shape, e.g. square, rectangular or hexagonal. It is expected that parallel-walled indentations may be easier to construct but inverted pyramids could allow for additional pinhole detector sections 35 at inner surface 38.

It will also be appreciated that these detector shapes and features, together with the additional components and methods disclosed, may be applicable to x-ray detection (medical and non-medical), mammography and CT scanner. They may also be applicable to astrophysics, where collimated detectors are used to detect stellar gamma rays.

The processor 24 is configured to execute computer-executable program instructions stored in processor 24 or an associated computer readable medium (i.e. memory). Processor 24 may be one or more processors, including one or more microprocessors, or ASICs, or other processors, or any combination thereof. The processor 24 may itself include, or may be associated with, computer-readable media storing instructions that constitute a program to cause the processor 24 to perform the steps described in this specification, when the instructions are executed by the processor 24.

Computer readable media may include, for example, an ASIC, RAM, ROM, a memory chip, magnetic media, DVD, CD ROM, floppy disk, optical media or electronic media.

It will be appreciated that, although the invention has been disclosed in detail using the context of SPECT imaging, the invention is applicable mutatis mutandis to other contexts, ordinary photography (which uses photons in the visible frequencies) or astrophysical gamma ray imaging. In general, the invention may be used as a camera for creating an image of matter, where the matter is something other than a body tissue being imaged, and image is of a type other than a SPECT image.

Thus, for example, the invention could be applied to a camera used to take ordinary photographs. Instead of a SPECT camera imaging specifically body tissue, the camera would create a visual image using visible light detected by the photon detector. A visible-light-camera's photon detector is typically not sensitive to non-visible photons. Rather, it is preconfigured to detect visible light but not light outside that range. Thus, there would typically be no need for the computerized image processor to exclude photons outside a predetermined energy range, though in some specific applications that may be desirable. Applying the present invention to ordinary photography could facilitate photography without the need for lenses. The same is true in respect of any similar application which has typically used refractive lenses.

As another example, the invention could be applied to astrophysical gamma ray imaging, wherein gamma ray imaging is used to create images of space and bodies in space, rather than a body tissue. The photon detector for such an imaging apparatus is typically configured to be sensitive to gamma rays only. It is preconfigured to detect gamma rays but not photons outside that range. Thus, there would typically be no need for the computerized image processor to exclude photons outside a predetermined energy range, though in some specific applications that may be desirable.

It will be appreciated that in both of these applications, no 3D imaging would be done. Rather, the computerized image processor, in cooperation with the photon detector, would function to create a two-dimensional image using the probabilistic imaging algorithm, which itself makes use of the probabilities that each photon came from various trajectories (as described above).

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims.

The invention claimed is:

1. A SPECT camera for creating a SPECT image of a body tissue, comprising:
   a selectively positionable photon detector, including a detector surface, for (1) detecting photons from the body tissue incident on the detector surface, (2) emitting a photon incidence signal for each said incident photon, the photon incidence signal including incidence location information for the corresponding photon, and (3) emitting a photon energy signal for each said incident photon, the photon energy signal including energy level information for the corresponding photon;

a computerized image processor, operatively connected to the photon detector, for (1) receiving the photon incidence signals and photon energy signals transmitted by the detector, (2) processing the photon energy signals to exclude from the SPECT image photons having energy levels outside a predetermined energy level range, and (3) processing the photon incidence signals to produce a SPECT image dataset, using the incidence location information for each incident photon;

the detector surface comprising at least one non-flat feature configured such that, during imaging of the body tissue, at least a portion of the photons emitted from the body tissue are blocked from incidence upon at least a portion of the detector surface, the at least one non-flat feature comprising a plurality of protuberances and indentations;

the photon detector being configured and positioned to admit to the detector surface uncollimated photons from the body tissue;

the computerized image processor being programmed with a probabilistic imaging algorithm to create the SPECT image, wherein when each incident photon from the body tissue is detected at a respective detection point on the detector surface, each of a plurality of possible incoming trajectories has a corresponding non-zero probability, and these probabilities are used in creating the SPECT image.

2. The SPECT camera as claimed in claim 1, wherein the detector comprises CZT positioned at said detector surface.

3. The SPECT camera as claimed in claim 2, wherein a thickness of the CZT varies over the area of the detector surface.

4. The SPECT camera as claimed in claim 1, wherein the plurality of protuberances and indentations comprises a first series of parallel spaced-apart ridges, and a second series of parallel spaced-apart ridges generally perpendicular to the first series to form a grid.

5. The SPECT camera as claimed in claim 4, wherein said indentations are positioned between said ridges.

6. The SPECT camera as claimed in claim 1, wherein the detector surface comprises an outer surface and an inner surface, the outer surface comprising the indentations and protuberances, the outer surface further comprising pinholes, the pinholes and inner surface being configured and positioned such that photons passing through said pinholes are detected on said inner surface.

7. The SPECT camera as claimed in claim 6, wherein the inner surface is comprised of inner surface sections, each said inner surface section corresponding to a distinct one of said pinholes.

8. The SPECT camera as claimed in claim 7, further comprising a plurality of inner septa positioned to prevent photons passing through a particular pinhole from being detected on an inner surface section not corresponding to the particular pinhole.

9. The SPECT camera as claimed in claim 1, wherein the camera further includes absorptive outer septa extending outward from the detector surface configured and positioned to block photons, approaching the surface from an oblique angle, from reaching the detector surface.

10. The SPECT camera as claimed in claim 1, wherein the detector surface is configured to translate while scanning to create a SPECT image.

11. The SPECT camera as claimed in claim 1, wherein the detector surface is configured to rotate while scanning to create a SPECT image.

12. The SPECT camera as claimed in claim 1, wherein the detector surface is configured for rectilinear movement during scanning to create a SPECT image.

13. The SPECT camera as claimed in claim 1, wherein at least one portion of the detector surface comprises CZT, and at least another portion comprises NaI.

14. The SPECT camera as claimed in claim 1, further comprising an apparatus for measuring a depth of interaction of detected photons, wherein the probabilistic imaging algorithm is configured to probabilistically associate deeper interactions with perpendicular trajectories and shallower interactions with oblique trajectories.

15. A photon detector for use in SPECT imaging, the photon detector comprising a detector surface for detecting photons incident on the detector surface, the detector surface comprising at least one non-flat feature configured such that, during imaging of the body tissue, at least a portion of the photons emitted from the body tissue are blocked from incidence upon at least a portion of the detector surface, the at least one non-flat feature comprising a plurality of protuberances and indentations;

wherein the detector surface comprises an outer surface and an inner surface, the outer surface comprising the indentations and protuberances, the outer surface further comprising pinholes, the pinholes and inner surface being configured and positioned such that photons passing through said pinholes are detected on said inner surface.

16. The SPECT camera as claimed in claim 15, wherein the detector comprises CZT positioned at said detector surface.

17. The SPECT camera as claimed in claim 16, wherein a thickness of the CZT varies over the area of the detector surface.

18. The SPECT camera as claimed in claim 15, wherein the plurality of protuberances and indentations comprises a first series of parallel spaced-apart ridges, and a second series of parallel spaced-apart ridges generally perpendicular to the first series to form a grid.

19. The SPECT camera as claimed in claim 18, wherein said indentations are positioned between said ridges.

20. The SPECT camera as claimed in claim 15, wherein the camera further includes absorptive outer septa extending outward from the detector surface configured and positioned to block photons, approaching the surface from an oblique angle, from reaching the detector surface.

21. The SPECT camera as claimed in claim 15, wherein the detector surface is configured to translate during creating of 2D SPECT images.

22. The SPECT camera as claimed in claim 15, wherein the detector surface is configured to rotate during creating of 2D SPECT images.

23. The SPECT camera as claimed in claim 15, wherein the detector surface is configured for rectilinear scanning during creating of 2D SPECT images.

24. The SPECT camera as claimed in claim 15, wherein at least one portion of the detector surface comprises CZT, and at least another portion comprises NaI.

25. The photon detector as claimed in claim 15, wherein the inner surface is comprised of inner surface sections, each said inner surface section corresponding to a distinct one of said pinholes.

26. The photon detector as claimed in claim 25, further comprising a plurality of inner septa positioned to prevent photons passing through a particular pinhole from being detected on an inner surface section not corresponding to the particular pinhole.

27. The photon detector as claimed in claim 15, further comprising an apparatus for measuring a depth of interaction of detected photons.

28. A camera for creating an image, comprising:
   a photon detector, including a detector surface, for (1) detecting photons incident on the detector surface, and (2) emitting a photon incidence signal for each said incident photon, the photon incidence signal including incidence location information for the corresponding photon, the photon detector being preconfigured to detect photons in a predetermined energy range, but not outside the predetermined energy range;
   a computerized image processor, operatively connected to the photon detector, for (1) receiving the photon incidence transmitted by the detector, and (2) processing the photon incidence signals to produce an image dataset, using the incidence location information for each incident photon;
   the detector surface comprising at least one non-flat feature configured such that, during imaging, at least a portion of the photons are blocked from incidence upon at least a portion of the detector surface, the at least one non-flat feature comprising a plurality of protuberances and indentations;
   the photon detector being configured and positioned to admit to the detector surface uncollimated photons;
   the computerized image processor being programmed with probabilistic imaging algorithm to create the image, wherein when each incident photon is detected at a respective detection point on the detector surface, each of a plurality of possible incoming trajectories has a corresponding non-zero probability, and these probabilities are used in creating the image.

29. A camera as claimed in claim 28, wherein the predetermined energy range comprises the energy range of visible light.

30. A camera as claimed in claim 28, wherein the predetermined energy range comprises the energy range of astrophysical gamma rays.

* * * * *

UNITED STATES PATENT AND TRADEMARK OFFICE
CERTIFICATE OF CORRECTION

PATENT NO. : 10,209,369 B2
APPLICATION NO. : 15/303305
DATED : February 19, 2019
INVENTOR(S) : Elazar A. Bienenstock Page 1 of 1

It is certified that error appears in the above-identified patent and that said Letters Patent is hereby corrected as shown below:

In the Claims

Column 18, Line 32, Claim 16, delete "SPECT camera" and insert -- photon detector --

Column 18, Line 35, Claim 17, delete "SPECT camera" and insert -- photon detector --

Column 18, Line 38, Claim 18, delete "SPECT camera" and insert -- photon detector --

Column 18, Line 43, Claim 19, delete "SPECT camera" and insert -- photon detector --

Column 18, Line 45, Claim 20, delete "SPECT camera" and insert -- photon detector --

Column 18, Line 50, Claim 21, delete "SPECT camera" and insert -- photon detector --

Column 18, Line 53, Claim 22, delete "SPECT camera" and insert -- photon detector --

Column 18, Line 56, Claim 23, delete "SPECT camera" and insert -- photon detector --

Column 18, Line 59, Claim 24, delete "SPECT camera" and insert -- photon detector --

Signed and Sealed this
Twenty-third Day of April, 2019

Andrei Iancu
*Director of the United States Patent and Trademark Office*